United States Patent [19]

Goddard et al.

[11] Patent Number: 4,883,410
[45] Date of Patent: Nov. 28, 1989

[54] FUEL SUPPLY SYSTEMS

[75] Inventors: John Goddard; Peter Taylor, both of Hampshire, England

[73] Assignee: Plessey Overseas Limited, Ilford, England

[21] Appl. No.: 297,365

[22] Filed: Jan. 17, 1989

[30] Foreign Application Priority Data

Jan. 18, 1988 [GB] United Kingdom ............... 8801037

[51] Int. Cl.[4] .............................................. F04C 19/00
[52] U.S. Cl. .................................... 417/69; 417/78; 417/89; 244/135 R
[58] Field of Search ................... 417/68, 69, 76–81, 417/84, 87, 89; 60/734; 55/194; 244/135 R

[56] References Cited

U.S. PATENT DOCUMENTS 1,711,902  5/1929  Neumann .................. 417/69
4,505,645  3/1985  Laguilhare ................ 417/69

FOREIGN PATENT DOCUMENTS 42431   6/1930  Denmark ................... 417/69
892248  3/1944  France ..................... 417/69

Primary Examiner—Carlton R. Croyle
Assistant Examiner—Robert N. Blackmon
Attorney, Agent, or Firm—Fleit, Jacobson, Cohn, Price, Holman & Stern

[57] ABSTRACT

A liquid fuel pump arrangement for delivering fuel to an engine comprises a liquid-ring pump including a motor driven bladed impeller rotor which is located eccentrically within a cylindrical bore of a chamber forming part of a hollow pump body structure. The hollow pump body structure also accommodates a motor-driven prime pump impeller which pumps fuel within the pump body structure to an aircraft or other engine. An inner end wall of the liquid ring pump provides the liquid ring with access to the liquid fuel within the pump body structure while an outer end wall of the liquid ring pump has an air/vapor inlet port through which the bladed impeller of the liquid ring pump during rotation thereof draws air/vapor and an air/vapor outlet port the flow of air/vapor expelled therefrom by compression of the air/vapor within the liquid ring in response to rotation of the bladed impeller being restricted by flow restriction means.

6 Claims, 1 Drawing Sheet

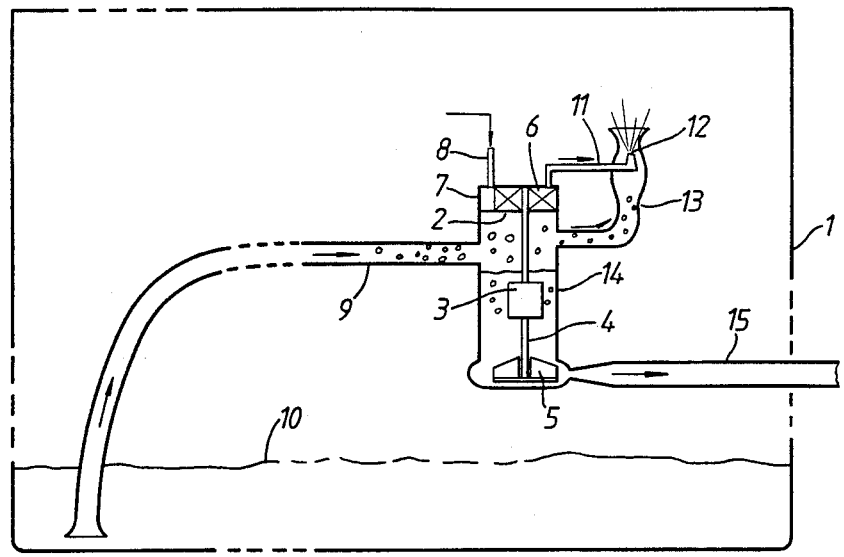

FUEL SUPPLY SYSTEMS

This invention relates to fuel supply systems and relates more specifically to fuel pump arrangements in such systems for delivering fuel to aircraft or other engines.

Aircraft fuel pumps are often located some distance away from the points where they are removing the fuel from the fuel tank, even though the pumps may themselves be located within the fuel tank. So-called liquid-ring fuel pumps are therefore commonly used in aircraft for removing air/vapour from the fuel inlet pipe extending from the fuel tank to the aircraft pump. Such liquid-ring pumps include a bladed impeller rotor which is located eccentrically within a larger diameter bore of the pump body, so that during rotation of the impeller rotor the blade tips thereof come into close proximity with the wall of the body bore at one position only. The respective ends of the pump body bore containing the bladed impeller may be closed by end covers one or both of which support a shaft mounting the bladed impeller and which contain suitably located air/vapour inlet and outlet ports, respectively. In operation of such pumps, fuel entering the pump is centrigued outwards by the rotating impeller and defines a liquid-ring which moves concentrically within the pump body bore. Since the impeller is eccentric relative to the body bore a crescent-shaped cavity forms between the impeller hub and the inner periphery of the liquid-ring, this cavity being divided by the blades of the impeller into cells of different volume. The crescent-shaped cavity starts to form at the point of minimum rotor tip clearance and increases through the first 180° section which is where the inlet port is located thereby allowing air/vapour to be drawn into the pump to fill each cell as it expands. Through the other 180° section of the crescent the volume of each cell decreases thereby imparting a pumping action which expels the air/vapour from the outlet port located in this section of the pump. It will be appreciated that sufficient fuel should always be stored in the pump at all times in order to maintain the liquid-ring until air/vapour has been sucked from the fuel inlet pipe and pump prime achieved with fuel then being pumped to the aircraft engines by a further bladed impeller usually mounted on the same motor-driven shaft as the ring pump eccentric bladed impeller.

The air/vapour expelled from the liquid-ring pump will usually be fed back to the fuel tank.

These liquid-ring pumps operate satisfactorily until the local pressure within the pump drops so that the fuel forming the liquid-ring boils and the pumping action of the pump fails due to vapour blockage.

According to the present invention as broadly conceived a liquid-ring pump in an aircraft or other fuel pumping arrangement is arranged to function as an air/vapour compressor by restricting the normal air/vapour outlet port of the pump. By using the liquid-ring pump as an air/vapour compressor the fuel within the liquid-ring will have a higher static pressure due to the compressive action of the pump and this higher static pressure will prevent the liquid ring from boiling and thereby causing failure due to vapour blockage.

In carrying out the present invention air/vapour drawn into the liquid-ring pump, preferably from the fuel tank of an aircraft, through the normal air inlet point of the pump is compressed by the pump whilst being expelled through the normal air outlet port of the pump due to the restrictive jet of a jet pump which provides the suction for drawing and expelling air/vapour from the fuel inlet line. The back pressure exerted on the liquid-ring raises the static pressure and thereby prevents boiling of the liquid-ring. Incoming fuel having air/vapour removed therefrom, is then pumped to the aircraft engine by the impeller of a prime pump preferably driven by the shaft of the liquid-ring pump.

By way of example the present invention will now be described with reference to the accompanying single-figure drawing which shows a schematic diagram of a fuel pumping arrangement for an aircraft.

Referring to the drawing the fuel pumping arrangement illustrated is actually located within an aircraft fuel tank 1 and comprises a liquid-ring pump 2 arranged to be driven by an electric motor 3 through a driving shaft 4 to which a prime pumping impeller 5 is also connected. The liquid-ring pump 2 is constructed as already described having a bladed impeller 6 mounted eccentrically within a cylindrical pump body bore 7 and provides by centrifugal action a liquid fuel ring in response to rotation of the impeller. As will be seen from the drawing, however, air/vapour inlet 8 to the liquid-ring pump 2 instead of being connected to draw air/vapour from a fuel inlet line 9 is connected in the present example to draw air/vapour from the fuel tank space above the fuel level 10, but it could alternatively be drawn from some other non hazardous source of air. The air/vapour drawn into the ring pump 2 is expelled through the normal air outlet port 11 of the pump but the flow of expelled air is restricted by the jet 12 of a jet pump 13. The restrictive effect of the orifice of the jet 12 on the ring pump 2 serves to create a back pressure at the ring pump outlet 11 which causes the static pressure of the liquid-ring to be raised and thereby prevent boiling of the fuel within the ring pump and consequential pump failure due to vapour blockage. The air/vapour expelled through the jet 12 of the jet pump 13 causes air/vapour in the fuel entering the overall pump 14 through the fuel inlet line 9 to be drawn through the pump and exhausted into the fuel tank whilst the air/vapour free fuel is pumped to the aircraft engine or engines by the prime pump impeller 5 over a fuel outlet line 15.

As will be appreciated, the air vapour in the fuel inlet line 9 during initial fuel lift an engine start up and any air vapour in the fuel, especially during boiling of the fuel in the fuel tank 1 which may take place at altitudes of about 40,000 feet and above, will be removed by the jet pump 13 with the ring pump 2 acting as a compressor rather than a suction pump to prevent the liquid fuel ring from boiling whilst driving the jet pump with its expelled air/vapour.

We claim:

1. A liquid fuel pump arrangement for delivering liquid fuel to an engine comprising a liquid-ring pump including a motor-driven bladed impeller rotor which is located eccentrically within a cylindrical bore of a chamber forming part of a hollow pump body structure so that during rotation of the impeller rotor the blade tips thereof come into close proximity with the cylindrical wall of said bore at one position only, the hollow pump body structure also accommodating a motor-driven prime pump impeller which pumps fuel within the pump body structure to an aircraft or other engine, in which an inner end wall of the liquid ring pump provides the liquid ring with access to the liquid fuel within the hollow pump body structure whilst an outer end wall of the liquid ring pump has an air/vapour inlet port through which the bladed impeller of the liquid ring pump during rotation thereof draws air/vapour and an air/vapour outlet port the flow of air/vapour expelled therefrom by compression of the air/vapour within the liquid-ring in response to rotation of the bladed impeller being restricted by flow the restriction means in order to build up static pressure within the liquid ring to a level preventing boiling of the liquid within the ring which could cause vapour blockage of the pump.

2. A liquid fuel pump arrangement as claimed in claim 1, in which the hollow pump body structure accommodates an electric motor for driving the bladed impeller rotor of the liquid-ring pump and the prime pump impeller.

3. A liquid fuel pump arrangement as claimed in claim 1, in which the flow restriction means comprises the jet orifice of a jet pump and the air/vapour expelled through the jet orifice is used to cause air/vapour in the fuel entering the hollow pump body from a fuel tank through a fuel line to be drawn around the jet orifice and through the jet pump and exhausted.

4. A liquid fuel pump arrangement as claimed in claim 3, in which the air/vapour exhausted through the jet pump is exhausted into the fuel tank.

5. A liquid fuel pump arrangement as claimed in claim 1, in which the liquid-ring pump draws air/vapour from a fuel tank through the air/vapour inlet port.

6. A liquid fuel pump arrangement as claimed in claim 1, in which the pump is located within a fuel tank.

* * * * *